United States Patent
Li et al.

(10) Patent No.: US 8,068,812 B2
(45) Date of Patent: Nov. 29, 2011

(54) METHOD AND MOBILE COMMUNICATION SYSTEM WITH A SECURITY FUNCTION FOR SHORT MESSAGING

(75) Inventors: Bing Li, Shenzhen (CN); Xiao-Guang Li, Shenzhen (CN)

(73) Assignees: Ensky Technology (Shenzhen) Co., Ltd., Baoan District, Shenzhen, Guangdong Province; Ensky Technology Co., Ltd., Banqiao Dist., New Taipei (TW)

( * ) Notice: Subject to any disclaimer, the term of this patent is extended or adjusted under 35 U.S.C. 154(b) by 826 days.

(21) Appl. No.: 12/125,916

(22) Filed: May 23, 2008

(65) Prior Publication Data

US 2008/0305816 A1    Dec. 11, 2008

(30) Foreign Application Priority Data

Jun. 8, 2007    (CN) .......................... 2007 1 0074773

(51) Int. Cl.
*H04M 1/66* (2006.01)
*H04W 4/00* (2009.01)
*H04L 9/32* (2006.01)
*H04B 1/00* (2006.01)

(52) U.S. Cl. ...... 455/411; 455/41.1; 455/41.2; 455/466; 455/567; 713/168; 713/170; 713/184; 340/5.8

(58) Field of Classification Search .................. 455/410, 455/411, 466, 412.1, 412.2, 41.1, 41.2, 566, 455/567, 569.1; 340/5.8; 713/168, 170, 713/184

See application file for complete search history.

(56) References Cited

U.S. PATENT DOCUMENTS

| | | | |
|---|---|---|---|
| 5,131,038 A * | 7/1992 | Puhl et al. | 340/5.61 |
| 6,044,148 A * | 3/2000 | Bleile | 379/373.02 |
| 6,859,650 B1 * | 2/2005 | Ritter | 455/406 |
| 7,076,657 B2 | 7/2006 | Koukoulidis | |
| 7,082,313 B2 | 7/2006 | Sabo | |
| 7,269,732 B2 * | 9/2007 | Kilian-Kehr | 713/172 |
| 7,299,364 B2 * | 11/2007 | Noble et al. | 713/189 |
| 2003/0005300 A1 * | 1/2003 | Noble et al. | 713/172 |
| 2003/0100261 A1 * | 5/2003 | Gusler et al. | 455/18 |
| 2003/0135748 A1 * | 7/2003 | Yamada et al. | 713/193 |
| 2003/0204721 A1 * | 10/2003 | Barrus et al. | 713/153 |
| 2005/0026643 A1 * | 2/2005 | White et al. | 455/550.1 |
| 2006/0073816 A1 * | 4/2006 | Kim et al. | 455/414.1 |
| 2006/0128408 A1 * | 6/2006 | Perttila et al. | 455/466 |
| 2006/0148454 A1 * | 7/2006 | Welch | 455/414.1 |
| 2006/0148496 A1 * | 7/2006 | Zhu et al. | 455/466 |
| 2007/0111704 A1 * | 5/2007 | Linkert et al. | 455/405 |
| 2008/0233942 A9 * | 9/2008 | Kim | 455/419 |

* cited by examiner

*Primary Examiner* — Duc M Nguyen

(74) *Attorney, Agent, or Firm* — Winston Hsu; Scott Margo

(57) ABSTRACT

The present invention relates to a communication system. The communication system includes a handheld communication device, a primary communication module, and a secondary communication apparatus. The primary communication module is configured for communicating with the secondary communication apparatus within a predetermined coverage area. When receiving a short message signal, the handheld communication device broadcasts a search signal. The secondary communication apparatus detects the search signal and sends a response signal to the handheld communication device according to the user's operations. The handheld communication device detects whether the response signal is received and processes accordingly. The present invention also provides a method of applying a security function for short messaging adapted for supporting the aforementioned communication system.

19 Claims, 7 Drawing Sheets

METHOD AND MOBILE COMMUNICATION SYSTEM WITH A SECURITY FUNCTION FOR SHORT MESSAGING

BACKGROUND

1. Technical Field

The present invention relates to communication systems, and particularly, to short message services of handheld communication devices.

2. Background

In wireless networks, end-user terminals, such as handheld communication devices, may be used to communicate in a variety of ways. One way is by short message services (SMS) feature. The most widely used application of handheld communication devices is SMS. Security of short message is important because the short message may be confidential.

In order to ensure that SMS messages are not inadvertently read by someone, a password is usually assigned to display the short message. When the user wants to read the short message, he must input the correct password. If the password is forgotten, the user will not be able to read the short message. If the user wants to share the password then a simple password may be used to ensure everyone can remember.

Accordingly, what is needed in the art is an automatic protection system that overcomes the deficiencies of the prior art.

SUMMARY

A communication system is provided. The communication system includes a handheld communication device and a secondary communication apparatus. The handheld communication device includes a detecting unit, a storage unit, a primary communication module, and a central processing unit (CPU). The storage unit stores short messages and phone numbers, wherein some of the phone numbers are cataloged into a special group. The primary communication module is configured for communicating with the secondary communication apparatus within a predetermined coverage area. The CPU is configured for invoking the primary communication module to send a search signal to the secondary communication apparatus, and for hiding the short message for the special group when the primary communication module doesn't receive a response signal from the secondary communication apparatus. Only when the handheld communication device receives the response signal from the secondary communication apparatus, a user of the handheld communication device can read the short message. Accordingly, the communication system makes sure a security function for short messaging.

Other advantages and novel features will be drawn from the following detailed description with reference to the attached drawing.

BRIEF DESCRIPTION OF THE DRAWINGS

The components in the drawings are not necessarily drawn to scale, the emphasis instead being placed upon clearly illustrating the principles of the communication system. Moreover, in the drawings, like reference numerals designate corresponding parts throughout the several views.

DETAILED DESCRIPTION OF THE EMBODIMENTS

Figure 1:
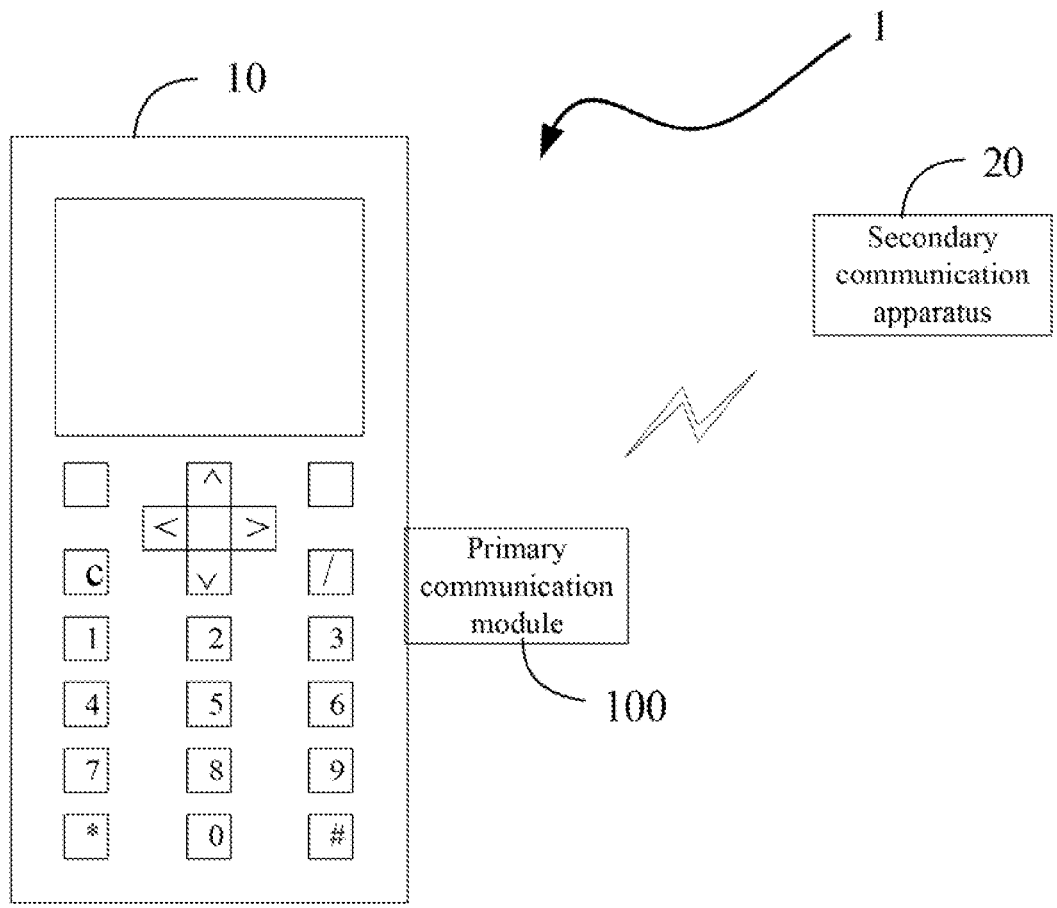
FIG. 1 is a schematic diagram of a hardware infrastructure of a communication system with a security function for short messaging, in accordance with an exemplary embodiment of the present invention.

FIG. 1 is a schematic diagram of a hardware infrastructure of a communication system with a security function for short messaging, in accordance with an exemplary embodiment of the present invention. The communication system 1 includes a handheld communication device 10 (hereinafter "the device") and a secondary communication apparatus 20 (hereinafter "the apparatus"). The device 10 includes a primary communication module 100. The primary communication module 100 is configured for communicating with the apparatus 20 within a predetermined coverage area. The predetermined coverage area may lie within a certain range, such as a five meter radius from the device 10 or the apparatus 20. The primary communication module 100 and the apparatus 20 may be Bluetooth modules, or radio frequency identification (RFID) modules. The device 10 may be a communication terminal such as a mobile phone, a personal digital assistant (PDA), etc. The apparatus 20 is an accessory of the device 10, and is carried by a user of the device 10. For example, the apparatus 20 can be worn on the wrist of the user, or pinned to the user's clothes.

When receiving a short message signal from an external wireless communication network (not shown), the device 10 broadcasts a search signal. The external wireless communication network may be a global system for mobile communication (GSM) network, a code division multiple access (CDMA) network, a general packet radio service (GPRS) network, or any other wireless network. The apparatus 20 detects the search signal and sends a response signal to the device 10 according to the user's operations, for example, when the apparatus 20 detects the search signal, the user may not operate the apparatus 20, namely where the apparatus 20 does not send out the response signal, or touch a button (not shown) of the apparatus 20, namely where the apparatus 20 sends out the response signal. The device 10 receives the response signal and processes the short message signal accordingly.

Figure 2:
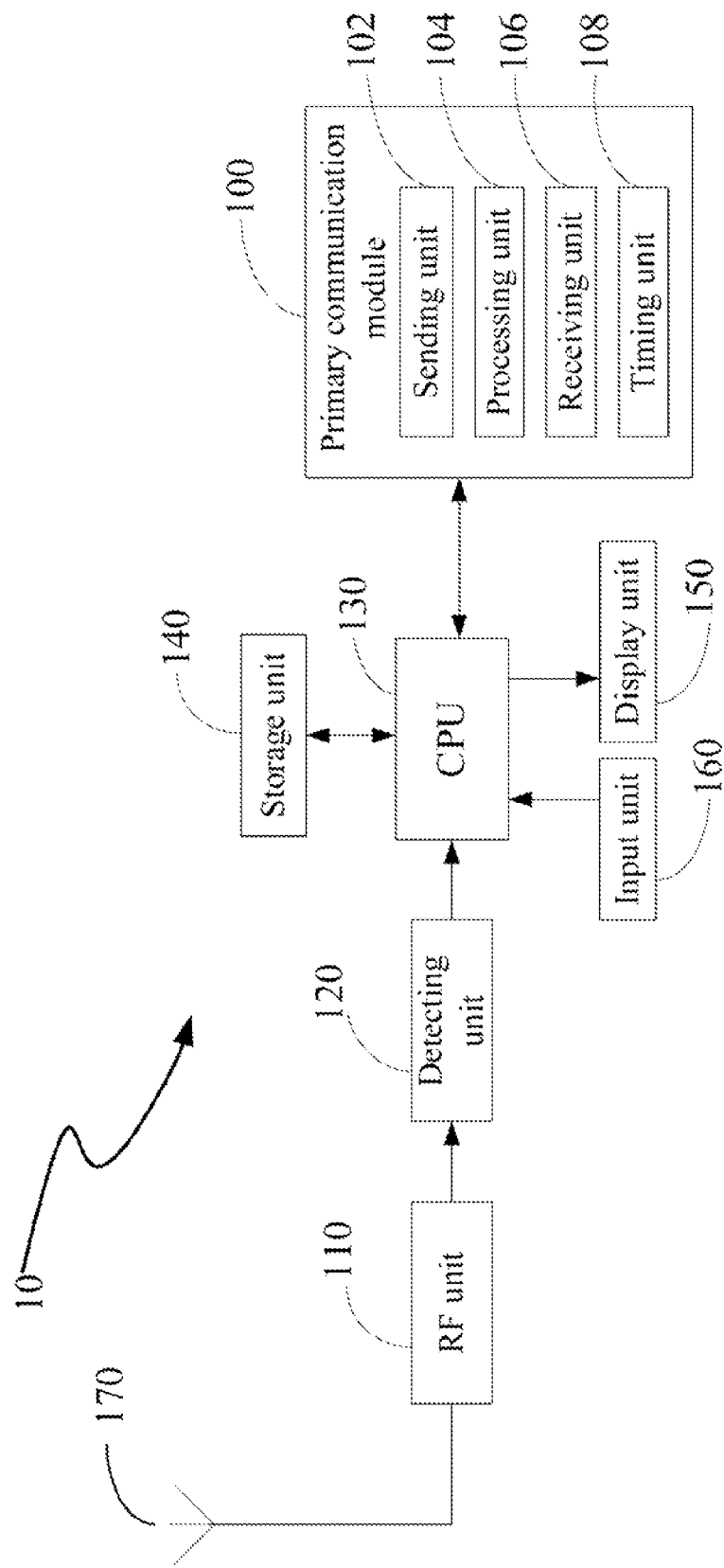
FIG. 2 is a block diagram of a hardware infrastructure of a handheld communication device of FIG. 1.

FIG. 2 is a block diagram of a hardware infrastructure of the device 10. The device 10 includes an antenna 170, a radio frequency (RF) unit 110, a detecting unit 120, a CPU 130, a storage unit 140, a display unit 150 (e.g., liquid crystal display (LCD)), a primary communication module 100, and an input unit 160. The input unit 160 typically includes a plurality of input keys. The antenna 170 and the RF unit 110 are configured for communicating with the external wireless communication network. The detecting unit 120 is configured for detecting and receiving the short message signal via the antenna 170 and the RF unit 110. The storage unit 140 is configured for storing short messages and phone numbers. The phone numbers can be grouped according to the user's personal preferences.

Figure 4:
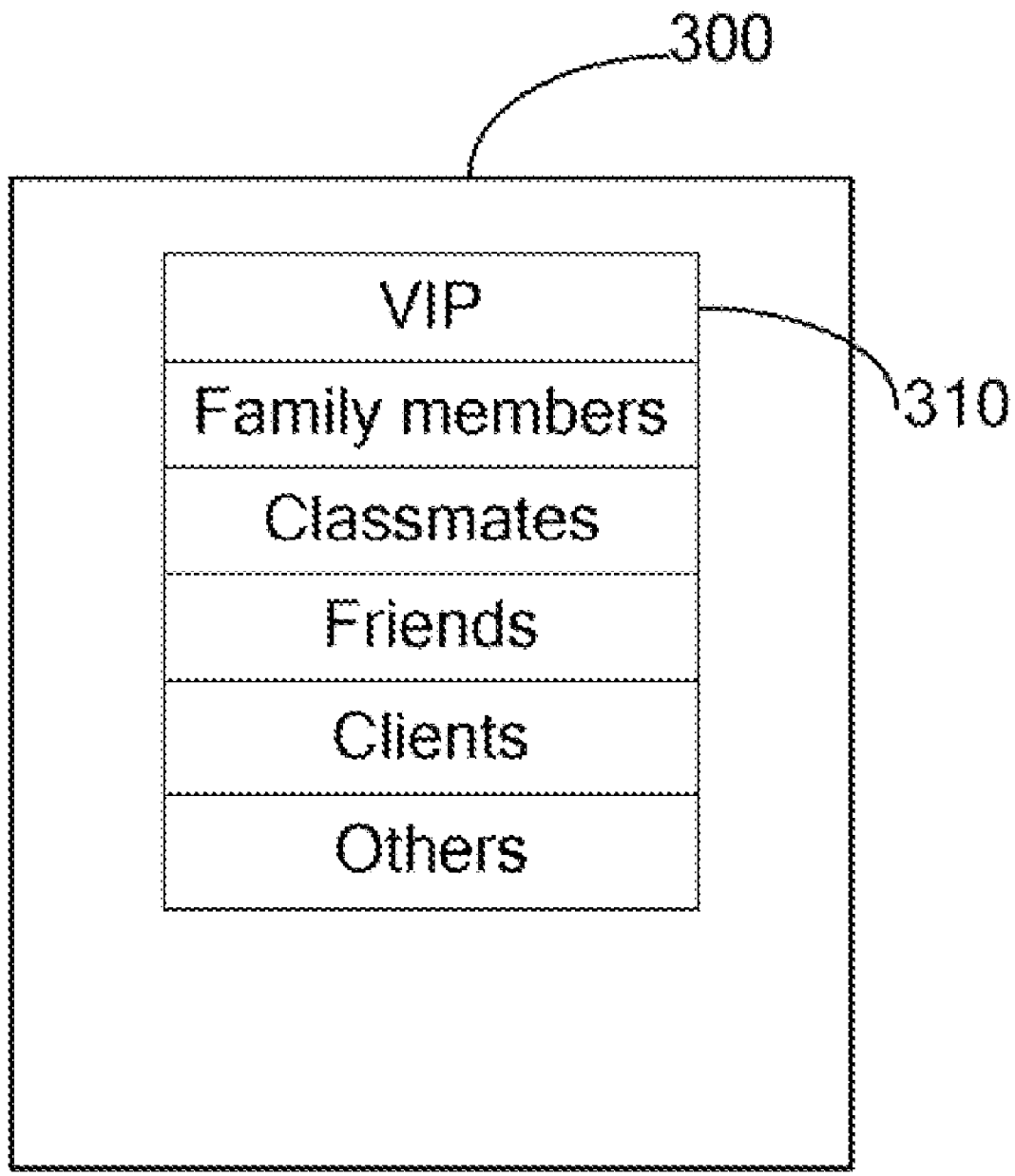
FIG. 4 is a display interface of the handheld communication device of FIG. 1.

FIG. 4 is a display interface 300 of the handheld communication device of FIG. 1. The display interface 300 of the device 10 includes, for example, six groups, such as a VIP group 310, a family members group, a classmates group, a friends group, a clients group, and an others group. The VIP group 310 is a special group preset by the user of the device 10.

Referring to FIG. 2 again, the CPU 130 is electrically coupled to the detecting unit 120 and is configured for controlling the primary communication module 100 to process the short message signal from the detecting unit 120. The CPU 130 further determines whether the device 10 hides or displays short messages for the special group. The display unit 150 is electrically coupled to the CPU 130 and is configured for receiving instructions from the CPU 130 and for displaying information.

The primary communication module 100 further includes a sending unit 102, a processing unit 104, a receiving unit 106, and a timing unit 108. Under control of the CPU 130, the processing unit 104 directs the sending unit 102 to send the search signal and at the same time directs the timing unit 108 to start to measure time. The processing unit 104 detects whether the receiving unit 106 receives the response signal from the apparatus 20. If the receiving unit 106 receives the response signal from the apparatus 20, the processing unit 104 controls the timing unit 108 to stop measuring time and sends a first signal indicative of receiving the response signal to the CPU 130. If the receiving unit 106 does not receive the response signal within a certain time, the processing unit 104 stops the timing unit 108 and sends a second signal indicative of not receiving the response signal to the CPU 130.

Figure 3:
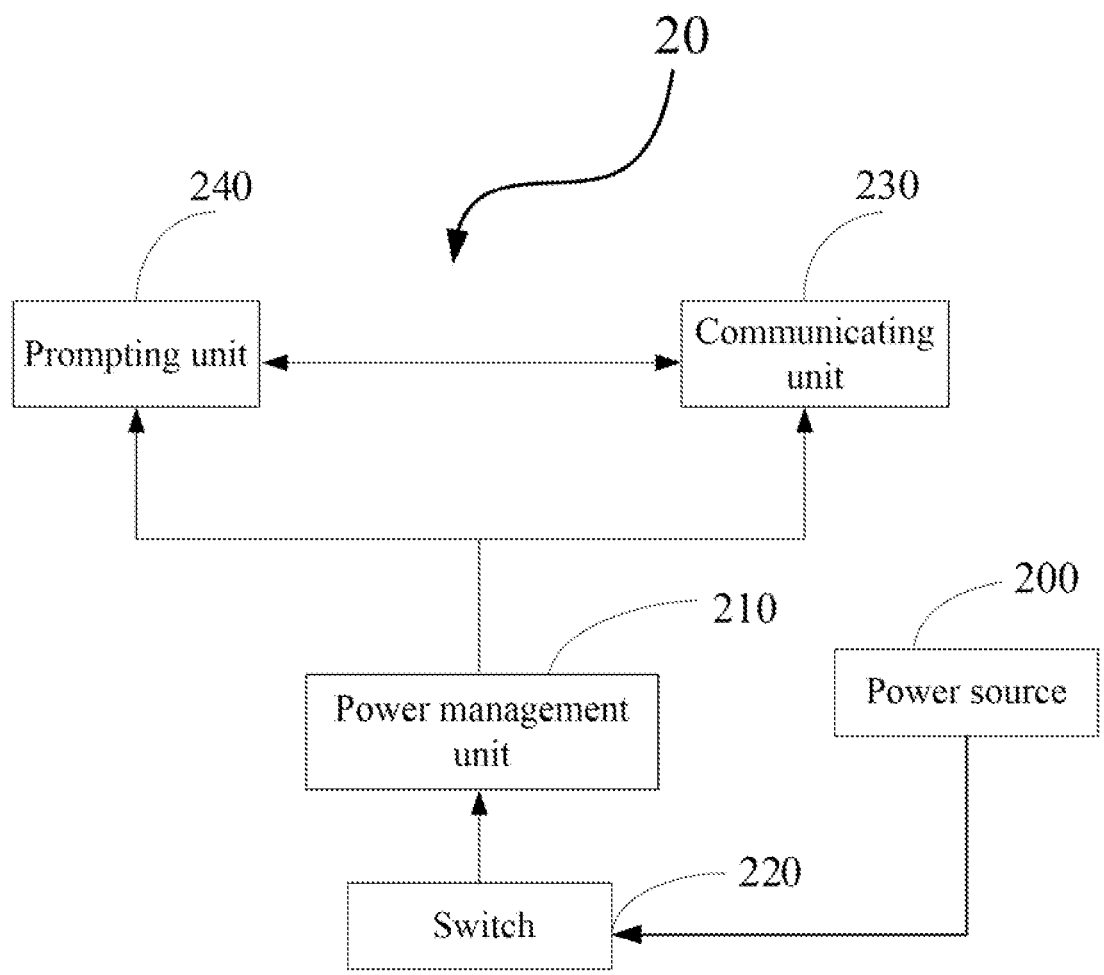
FIG. 3 is a block diagram of a hardware infrastructure of a secondary communication apparatus of FIG. 1.

FIG. 3 is a block diagram of a hardware infrastructure of the secondary communication apparatus 20 in accordance with an exemplary embodiment of the present invention. The apparatus 20 includes a power source 200, a power management unit 210, a switch 220, a communicating unit 230, and a prompting unit 240. The power source 200 is configured for supplying power to all units of the apparatus 20. When the switch 220 is off, the power management unit 210 controls the power source 200 to stop supplying power. When the switch 220 is on, the power management unit 210 controls the power source 200 to supply power. The communicating unit 230 is configured for receiving the search signal from the primary communication module 100 and sending the response signal to the primary communication module 100 according to the user's operations. After the communicating unit 230 receives the search signal, the prompting unit 240 is electrically coupled to the communicating unit 230 and is configured for prompting the user, by a flashing or vibrating signal, etc., that the device 10 has received the short message.

In a first exemplary embodiment, when the detecting unit 120 detects and receives the short message signal, the CPU 130 invokes the primary communication module 100 to send the search signal for detecting whether the apparatus 20 is within the predetermined coverage area. When the primary communication module 100 does not receive the response signal from the apparatus 20 within a predetermined time period, namely when a distance between the device 10 and the apparatus 20 exceeds the predetermined coverage area, or the apparatus 20 is turned off, or the user carrying the apparatus 20 does not operate the apparatus 20 within the predetermined time period after receiving the search signal, the CPU 130 identifies whether the phone number of the short message belongs to the VIP group 310, namely the CPU 130 acquires the phone number of the short message and compares the number with phone numbers of the VIP group 310.

If the phone number of the short message belongs to the VIP group 310, the CPU 130 deactivates a predetermined SMS tone and hides the short message. The predetermined SMS tone of the device 10 may be a melody, a vibration, or a combination of a melody and a vibration. If the phone number of the short message does not belong to the VIP group 310, the CPU 130 activates the predetermined SMS tone. When the primary communication module 100 receives the response signal from the apparatus 20 within the predetermined coverage area, the CPU 130 activates the predetermined SMS tone so as to prompt the user of the device 10 to look at the short message.

In a second exemplary embodiment, when the detecting unit 120 detects and receives the short message signal, the CPU 130 identifies whether the phone number of the short message belongs to the VIP group 310. If the phone number does not belong to the VIP group 310, the CPU 130 activates the predetermined SMS tone. If the phone number belongs to the VIP group 310, the CPU 130 invokes the primary communication module 100 to send the search signal for detecting whether the apparatus 20 is within the predetermined coverage area. If the primary communication module 100 receives the response signal from the apparatus 20 within the predetermined coverage area, the CPU 130 activates the predetermined SMS tone so as to prompt the user of the device 10 to look at the short message. If the primary communication module 100 does not receive the response signal from the apparatus 20, the CPU 130 deactivates the predetermined SMS tone and hides the short message for the VIP group 310.

In a third exemplary embodiment, when the device 10 receives a signal for opening an inbox for short messages, the CPU 130 invokes the primary communication module 100 to send the search signal for detecting whether the apparatus 20 is within the predetermined area. If the primary communication module 100 receives the response signal, the CPU 130 controls the display unit 150 to display all short messages in the inbox. If the primary communication module 100 does not receive the response signal, the CPU 130 controls the display unit 150 to display short messages except for the short messages for the VIP group 310.

Figure 5:
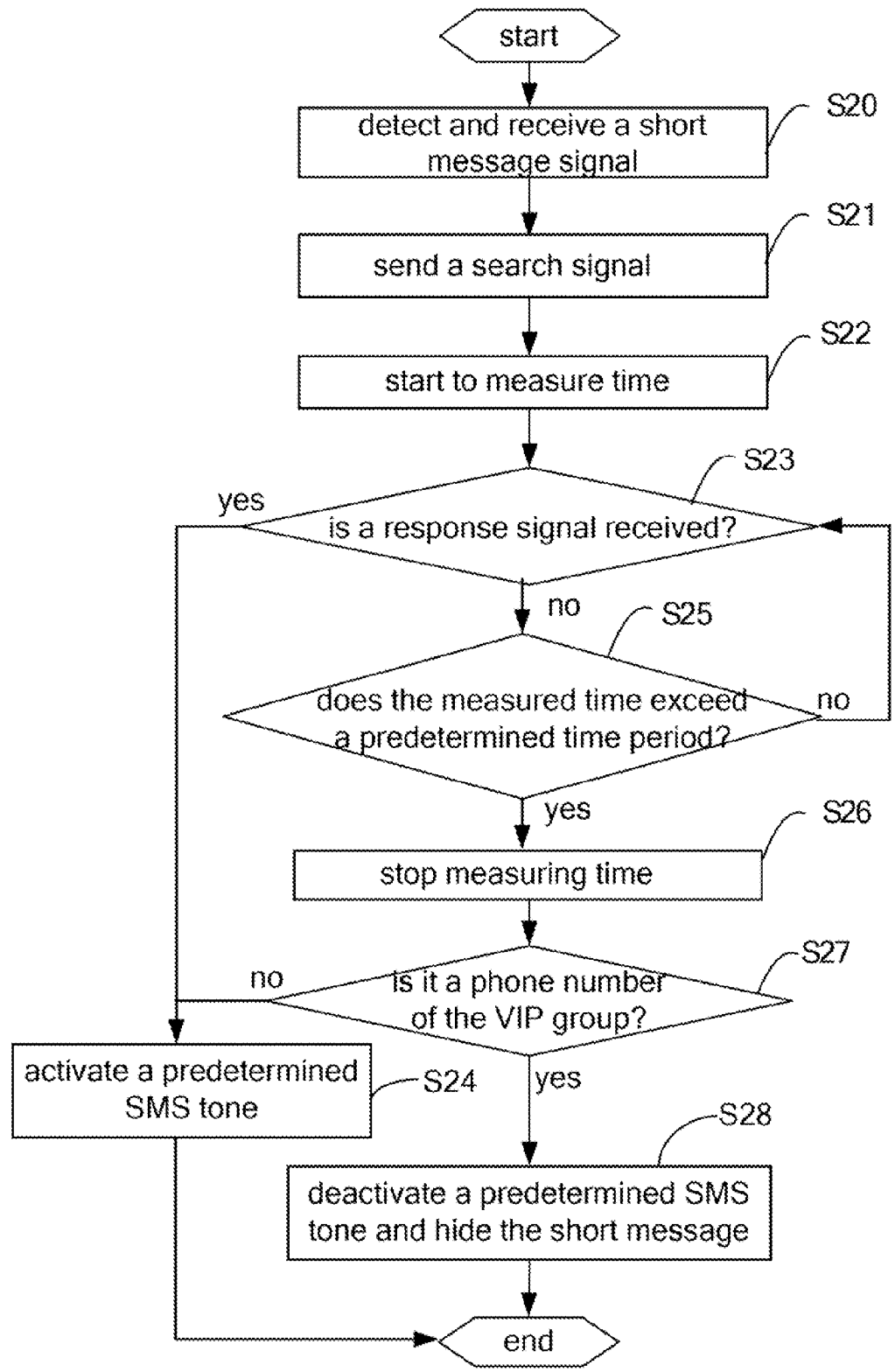
FIG. 5 is a flow chart illustrating a method of applying a security function for short messaging, performed by the communication system of FIG. 1, in accordance with a first exemplary embodiment of the present invention.

FIG. 5 is a flow chart illustrating a method of applying a security function for short messaging, performed by the communication system of FIG. 1, in accordance with a first exemplary embodiment of the present invention. In step S20, the device 10 is idle, and the detecting unit 120 detects and receives the short message signal. In step S21, the CPU 130 invokes the sending unit 102 of the primary communication module 100 to send the search signal. In step S22, the processing unit 104 invokes the timing unit 108 to start to measure time. In step S23, the primary communication module 100 detects whether the response signal from the apparatus 20 is received. If the primary communication module 100 receives the response signal from the apparatus 20, in step S24, the processing unit 104 sends the first signal indicative of receiving the response signal to the CPU 130 and the CPU 130 activates the predetermined SMS tone.

If the primary communication module 100 does not receive the response signal from the apparatus 20, in step S25, the processing unit 104 sends the second signal indicative of not receiving the response signal to the CPU 130 and the CPU 130 determines whether the measured time of the timing unit 108 exceeds the predetermined time period. If the measured time doesn't exceed the predetermined time period, the procedure returns to step S23. If the measured time exceeds the predetermined time period, in step S26, the processing unit 104 controls the timing unit 108 to stop measuring time. In step S27, the CPU 130 determines whether the phone number of the short message belongs to the VIP group 310. If the phone number does not belong to the VIP group 310, in step S24, the CPU 130 activates the predetermined SMS tone. If the phone number belongs to the VIP group 310, in step S28, the CPU 130 deactivates the predetermined SMS tone and hides the short message.

Figure 6:
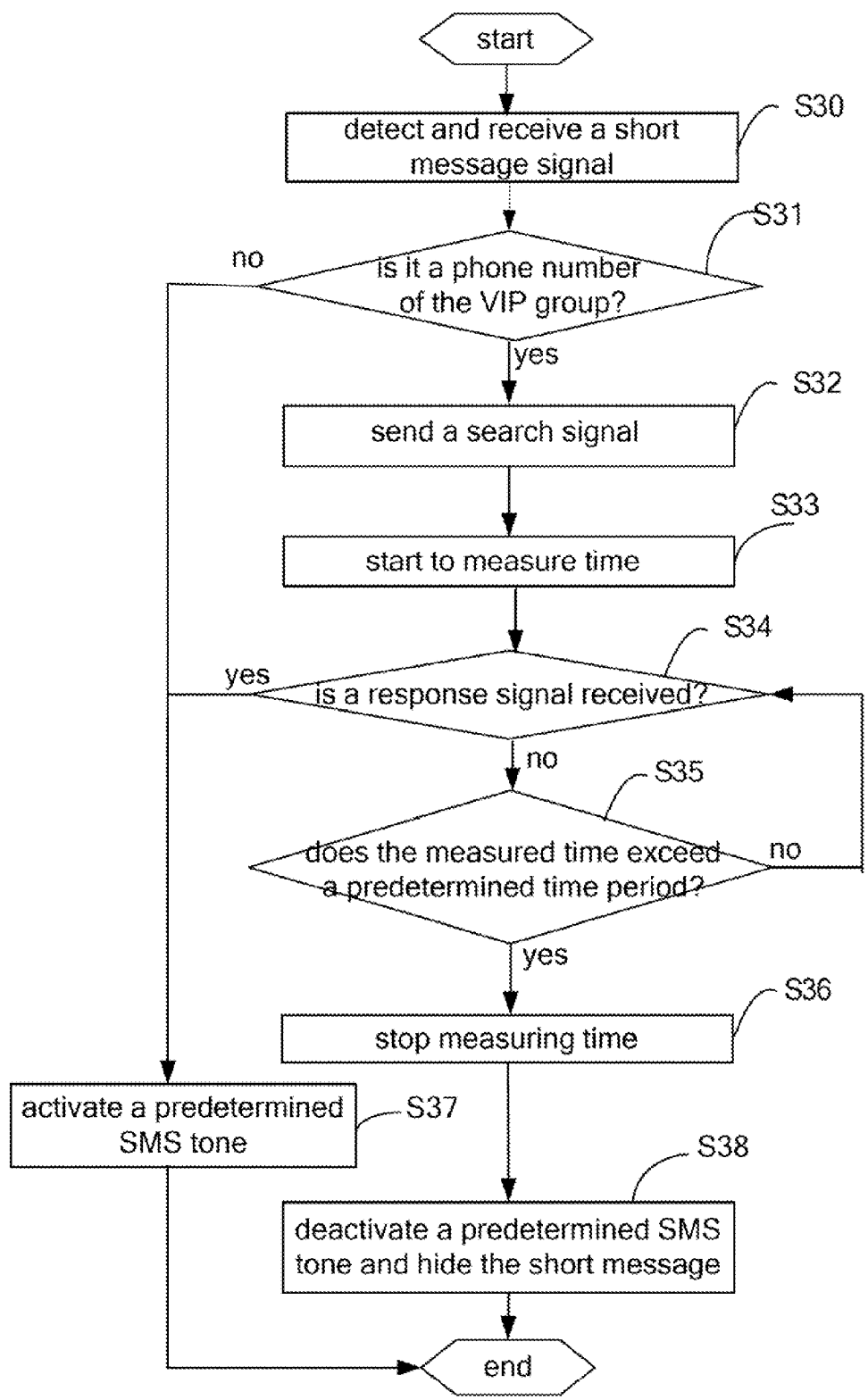
FIG. 6 is a flow chart illustrating a method of applying a security function for short messaging, performed by the communication system of FIG. 1, in accordance with a second exemplary embodiment of the present invention.

FIG. 6 is a flow chart illustrating a method of applying a security function for short messaging, performed by the communication system of FIG. 1, in accordance with a second exemplary embodiment of the present invention. In step S30, the device 10 is idle, and the detecting unit 120 detects and receives the short message signal. In step S31, the CPU 130 determines whether the phone number of the short message belongs to the VIP group 310. If the phone number does not belong to the VIP group 310, namely the phone number may belong to one of the family members group, the classmates group, the friends group, the clients group or the others group, in step S37, the CPU 130 activates the predetermined SMS tone. If the phone number belongs to the VIP group 310, in step S32, the CPU 130 invokes the sending unit 102 of the primary communication module 100 to send the search signal. In step S33, the processing unit 104 invokes the timing unit 108 to start to measure time. In step S34, the primary communication module 100 detects whether the response signal from the apparatus 20 is received. If the primary communication module 100 receives the response signal from the apparatus 20, in step S37, the processing unit 104 sends the first signal indicative of receiving the response signal to the CPU 130 and the CPU 130 activates the predetermined SMS tone.

If the primary communication module 100 does not receive the response signal from the apparatus 20, in step S35, the processing unit 104 sends the second signal indicative of not receiving the response signal to the CPU 130 and the CPU 130 determines whether the measured time of the timing unit 108 exceeds the predetermined time period. If the measured time doesn't exceed the predetermined time period, the procedure returns to step S34. If the measured time exceeds the predetermined time period, in step S36, the processing unit 104 controls the timing unit 108 to stop measuring time. In step S38, the CPU 130 deactivates the predetermined SMS tone and hides the short message.

Figure 7:
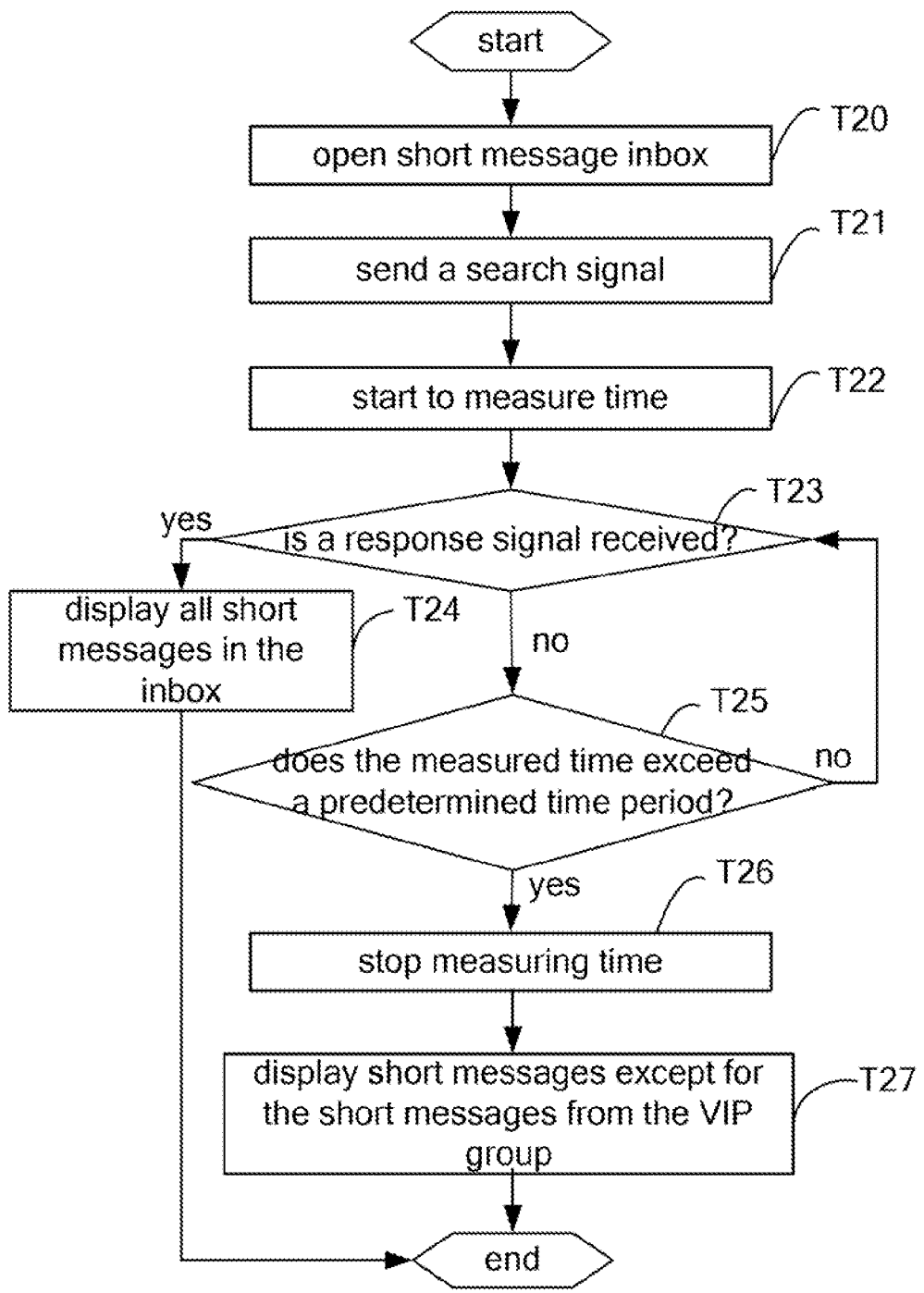
FIG. 7 is a flow chart illustrating a method of applying a security function for short messaging, performed by the communication system of FIG. 1, in accordance with a third exemplary embodiment of the present invention.

FIG. 7 is a flow chart illustrating a method of applying a security function for short messaging, performed by the communication system of FIG. 1, in accordance with a third exemplary embodiment of the present invention. When the CPU 130 receives the signal for opening the inbox for short messages from the input unit 160, in step T20, the procedure starts. In step T21, the CPU 130 invokes the sending unit 102 of the primary communication module 100 to send the search signal. In step T22, the processing unit 104 invokes the timing unit 108 to start to measure time. In step T23, the receiving unit 106 of the primary communication module 100 detects whether the response signal from the apparatus 20 is received. If the primary communication module 100 receives the response signal from the apparatus 20, in step T24, the processing unit 104 sends the first signal indicative of receiving the response signal to the CPU 130 and the CPU 130 invokes the display unit 150 to display all short messages in the inbox.

If the primary communication module 100 does not receive the response signal from the apparatus 20, in step T25, the processing unit 104 sends the second signal indicative of not receiving the response signal to the CPU 130 and the CPU 130 determines whether the measured time of the timing unit 108 exceeds the predetermined time period. If the measured time doesn't exceed the predetermined time period, the procedure returns to step T23. If the measured time exceeds the predetermined time period, in step T26, the processing unit 104 controls the timing unit 108 to stop measuring time. In step T27, the CPU 130 invokes the display unit 150 to display short messages except for the short messages for the VIP group 310.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A communication system comprising:
a handheld communication device; and
a secondary communication apparatus;
wherein the handheld communication device, comprising:
a detecting unit, for detecting and receiving a short message signal;
a storage unit, for storing short messages and phone numbers, wherein some of the phone numbers are cataloged into a special group;
a primary communication module, for communicating with the secondary communication apparatus within a predetermined coverage area; and
a CPU, for invoking the primary communication module to send a search signal to the secondary communication apparatus, for activating a predetermined SMS tone or displaying all short messages in the storage unit when the primary communication module receives a response signal from the secondary communication apparatus, and for hiding a short message or short messages for the special group when the primary communication module doesn't receive a response signal from the secondary communication apparatus.

2. The communication system as recited in claim 1, wherein the secondary communication apparatus is an accessory of the handheld communication device, and is carried by a user of the handheld communication device.

3. The communication system as recited in claim 1, wherein when the detecting unit detects and receives the short message signal, the CPU invokes the primary communication module to send the search signal to the secondary communication apparatus.

4. The communication system as recited in claim 1, wherein when the detecting unit detects and receives the short message signal and the CPU identifies that the phone number of the short message belongs to the special group, the CPU invokes the primary communication module to send the search signal to the secondary communication apparatus.

5. The communication system as recited in claim 1, wherein when the handheld communication device receives a signal for opening an inbox for short messages, the CPU invokes the primary communication module to send the search signal to the secondary communication apparatus.

6. The communication system as recited in claim 5, wherein when the primary communication module receives the response signal from the secondary communication apparatus, the CPU displays all short messages in the inbox.

7. The communication system as recited in claim 4, wherein when the primary communication module doesn't receive a response signal from the secondary communication apparatus, the CPU hides a short message for the special group corresponding to the short message signal from the detecting unit and deactivates the predetermined SMS tone.

8. The communication system as recited in claim 1, wherein the primary communication module comprises:
- a sending unit, for sending the search signal to the secondary communication apparatus;
- a receiving unit, for receiving the response signal from the secondary communication apparatus; and
- a processing unit, for invoking the sending unit to send the search signal to the secondary communication apparatus, and for sending a signal indicative to the CPU indicating whether the receiving unit receives the response signal from the secondary communication apparatus.

9. The communication system as recited in claim 8, wherein when the receiving unit receives the response signal, the processing unit sends a first signal indicative of receiving the response signal; and when the receiving unit does not receive the response signal, the processing unit sends a second signal indicative of not receiving the response signal.

10. The communication system as recited in claim 8, wherein the primary communication module further includes a timing unit for measuring time.

11. The communication system as recited in claim 1, wherein the primary communication module and the secondary communication apparatus are Bluetooth modules.

12. A handheld communication device adapted for communicating with a secondary communication apparatus within a predetermined coverage area, the handheld communication device comprising:
- a detecting unit, for detecting and receiving a short message signal;
- a storage unit, for storing short messages and phone numbers, wherein some of phone numbers are cataloged into a special group;
- a primary communication module, for communicating with the secondary communication apparatus within the predetermined coverage area; and
- a CPU, for invoking the primary communication module to send a search signal to the secondary communication apparatus, for activating a predetermined SMS tone or displaying all short messages in the storage unit when the primary communication module receives a response signal from the secondary communication apparatus, and for hiding a short message or short messages for the special group when the primary communication module doesn't receive a response signal from the secondary communication apparatus.

13. A method of applying a security function for short messaging adapted for a handheld communication device, wherein the handheld communication device comprising a primary communication module for communicating with a secondary communication apparatus within a predetermined coverage area, and storing short messages and phone numbers, wherein some of the phone numbers are cataloged into a special group, the method comprising:
- sending a search signal to the secondary communication apparatus;
- detecting whether receiving a response signal from the secondary communication apparatus;
- if receiving the response signal, activating a predetermined SMS tone or displaying all short messages; and
- if not receiving the response signal, hiding a short message or short messages for the special group.

14. The method of applying a security function for short messaging as recited in claim 13, further comprising: when detecting and receiving a short message signal, sending the search signal.

15. The method of applying a security function for short messaging as recited in claim 13, further comprising: when detecting and receiving the short message signal and identifying that the phone number of the short message belongs to the special group, sending the search signal.

16. The method of applying a security function for short messaging as recited in claim 13, further comprising: when receiving a signal for opening an inbox for short messages, sending the search signal.

17. The method of applying a security function for short messaging as recited in claim 13, further comprising: when not receiving the response signal, hiding the short message for the special group corresponding to the short message signal and deactivating the predetermined SMS tone.

18. The method of applying a security function for short messaging as recited in claim 16, further comprising: when not receiving the response signal, hiding the short messages for the special group and displaying short messages except for the short messages for the special group.

19. The method of applying a security function for short messaging as recited in claim 16, further comprising: when receiving the response signal, displaying all short messages in the inbox.

* * * * *